United States Patent [19]

Suzuki et al.

[11] 4,075,384

[45] Feb. 21, 1978

[54] MAGNETIC RECORDING TAPES WITH TWO-LAYERED MAGNETIC COATING

[75] Inventors: Masaaki Suzuki; Akira Kasuga, both of Odawara, Japan

[73] Assignee: Fuji Photo Film Co., Ltd., Minami-ashigara, Japan

[21] Appl. No.: 734,565

[22] Filed: Oct. 21, 1976

[30] Foreign Application Priority Data

Oct. 23, 1975 Japan .................................. 50-127724

[51] Int. Cl.² .......................... B32B 5/16; B32B 7/02; B32B 15/02
[52] U.S. Cl. ..................................... 428/212; 106/290; 106/304; 346/135; 360/131; 423/633; 423/634; 427/127; 427/131; 428/329; 428/900
[58] Field of Search ................ 106/290, 304; 427/131, 427/127; 252/62.54; 148/122, 31.5; 346/135; 264/DIG. 58; 423/633, 634; 428/148, 212, 308, 329, 332, 539, 900, 480; 360/131

[56] References Cited

U.S. PATENT DOCUMENTS

| 2,643,130 | 6/1953 | Kornei | 360/131 |
|---|---|---|---|
| 3,149,996 | 9/1964 | Wagner et al. | 360/131 X |
| 3,328,195 | 6/1967 | May | 360/131 X |
| 3,734,772 | 5/1973 | Schnell et al. | 428/148 |
| 3,761,311 | 9/1973 | Perrington et al. | 428/332 X |

OTHER PUBLICATIONS

Chikazumi, Physics of Ferromagnetic Substances, in Selected Works or Physics, No. 4, 4th Ed., 8/1/65, Shokabo, Japan.

Primary Examiner—Ralph S. Kendall
Assistant Examiner—R. Eugene Varndell, Jr.
Attorney, Agent, or Firm—Sughrue, Rothwell, Mion, Zinn and Macpeak

[57] ABSTRACT

A magnetic recording tape of improved properties comprising a non-magnetic support and a two-layered magnetic coating composed of a ferromagnetic powder and a binder and formed on one surface of the support, wherein the lower magnetic layer has a coercive force of about 250 to about 300 Oe, a residual magnetic flux density of at least about 1,500 Gauss and a dry thickness of at least about 2.5 μm, and the upper magnetic layer has a coercive force of about 350 to about 400 Oe, a residual magnetic flux density of not more than about 1,500 Gauss and a dry thickness of about 2.0 to 3.0 μm, the ferromagnetic powder in the upper magnetic layer having an APP value of not more than 1.0.

15 Claims, 3 Drawing Figures

MAGNETIC RECORDING TAPES WITH TWO-LAYERED MAGNETIC COATING

BACKGROUND OF THE INVENTION

1. Field of the Invention

This invention relates to a magnetic recording tape, more specifically, to a magnetic recording tape comprising a support and a two-layered magnetic coating formed on one surface thereof.

2. Description of the Prior Art

In recent years, there has been a need for improved quality and higher recording density in magnetic recording tapes for both open reels and cassettes, and investigations to meet this need have resulted in the production of magnetic tapes comprising at least two magnetic layers, which are generally referred to as multilayer coated tapes.

Such tapes are described, for example, in Japanese Patent Publications 2218/62 and 23678/64, Japanese Patent Applications (OPI) 31602/72 (U.S. Pat. No. 3,761,311), 37903/72, 31907/73 (U.S. Pat. No. 3,775,178), and 31804/75, in U.S. Pat. Nos. 2,643,130, 2,647,954, 2,941,901 and 3,676,217, and in West German Patent Publications 1,190,985 and 1,238,072, etc.

The setting of the bias and equalization are of concern with such magnetic tapes. The preset bias is about 100%, which is generally considered the standard bias. In general, magnetic tapes having the standard bias are used by the largest number of people and are of the most easily usable type. These magnetic tapes have the advantage that no special bias setting or the use of an equalizer is required.

The most convenient means for achieving higher recording density is to increase the coercive force of the ferromagnetic iron oxide used in magnetic tapes. However, such tapes are not exchangeable with those having the standard bias as described above, and in order to obtain optimal magnetic tape characteristics, it is necessary for the user to select a bias and equalization conforming to the magnetic tapes used. Not only is there user confusion with regard to the standard bias, chromium dioxide bias and multilayer bias and the choice of the correct bias and equalization, but also these magnetic tapes have poor interchangeability with many tape recorders and tape decks in ordinary use, and are thus difficult to use. For example, conventional two-layered tapes have improved low frequency output, but require special positions with regard to actuating bias and equalization, for example, as shown in Table 1.

TABLE 1

| Type of Magnetic Tape | Bias (%) (cf. 1) | Equalizer ($\mu \cdot$ sec) (cf. 2) |
| --- | --- | --- |
| Low noise type | 100 | 120 |
| Fe-Cr type (cf. 3) | 130 | 35 – 50 |
| $CrO_2$ | 160 | 70 |

(cf. 1) The bias of the low noise type is taken as the standard (100%).
(cf. 2) The time constant ($\mu \cdot$ sec) of equalization for the low noise type is taken as the standard (120 $\mu \cdot$ sec). Usually, the time constant in the case of a Fe-Cr type magnetic tape is 40 to 60% of the standard value, and the time constant in the case of a $CrO_2$ type is 50 to 70% of the standard value.
(cf. 3) DUAD® Ferri-Chrome Tape (made by Sony Corporation), and SCOTCH® Classic Cassette Tape (made by 3M Co., Ltd.) having a magnetic coating composed of an upper layer of $CrO_2$ and a lower layer of maghemite are examples.

Thus, these magnetic tapes cannot be used in the best condition unless tape recorders or tape decks used have the bias and the equalizer positions as shown in Table 1. The tape recorders or tape decks must be selected according to the manufacturers of magnetic recording tapes, and, thus, these magnetic tapes have the defect they are not universal.

SUMMARY OF THE INVENTION

It is one object of this invention, therefore, to provide a magnetic recording medium which in spite of its two-layered magnetic coating has an actuating bias and equalization similar to those of a standard tape and low noise tape, and can be used in tape recorders and tape decks not equipped with bias and equalization selectors.

A second object of this invention is to provide a magnetic recording tape with reduced head demagnetization and head wear.

A third object of this invention is to provide a magnetic recording tape having reduced distortion and superior MOL (Maximum Output Level, maximum distortionless output).

A fourth object of this invention is to provide a magnetic recording tape having well-balanced frequency characteristics and good output characteristics over the entire frequency range in the case of using standard equalization.

A fifth object of this invention is to provide a magnetic recording tape which does not exhibit an increase in noise level and consequently gives rise to an outstanding increase in the SN ratio.

In order to develop a magnetic tape which comprises a support and a two-layered magnetic coating formed on one surface thereof which can be used with standard bias and equalization, we made a series of investigations with particular attention directed to the average pore population value (APP value) of the magnetic iron oxide in the upper layer of the two-layered magnetic coating, its coercive force (Hc), and the thickness of the magnetic iron oxide layer. These investigations finally led to the present invention.

In this specification and claims, the APP value denotes the average number of pores in a magnetic iron oxide particle determined under electron microscope observation at high magnification.

According to the present invention, there is provided a magnetic recording tape comprising a non-magnetic support and a two-layered magnetic coating composed of a ferromagnetic powder and a binder formed on one surface of the support, wherein the lower magnetic layer has a coercive force of about 250 to about 300 Oe, a residual magnetic flux density of at least about 1,500 Gauss and a dry thickness of at least about 2.5 $\mu$m, and the upper magnetic layer has a coercive force of about 350 to about 400 Oe, a residual magnetic flux density of not more than about 1,500 Gauss and a dry thickness of about 2.0 to about 3.0 $\mu$m, wherein the ferromagnetic fine powder contained in the upper magnetic layer has an APP value of not more than about 1.0.

The invention is described in greater detail partly with reference to the accompanying drawings described below.

DETAILED DESCRIPTION OF THE INVENTION

It has already been disclosed theoretically as the "Lorenz's magnetic field" that where pores exist inside a uniformly magnetized magnetic substance, the magnetic field cased by these pores results in a reduction of the Hc of the magnetic substance (Fusanobu Chikazumi, Japanese language publication *Physics of Ferromagnetic Substances,* Selected Works on Physics No. 4, 4th edition, published on Aug. 1, 1965 by Shokabo, Japan). Thus, the APP value is a very important factor in determining the Hc. We have found that by decreasing one pore per particle, an increase in the Hc of about 30 to 50 Oe is observed, although this somewhat differs depending, for example, on the acicular ratio of the magnetic particles.

The term "APP value" is an abbreviation of Average Pore Population value and defines the number of pores per magnetic particle. The APP value is determined by first measuring the number of pores by observing 20 particles (average particle size is about 0.1 to 1 $\mu$m, preferably 0.2 to 0.6 $\mu$m; average acicular ratio of 5 : 1 to 15 : 1) by means of an electron microscope (50,000 × magnification) and then averaging the values obtained.

Figure 1:
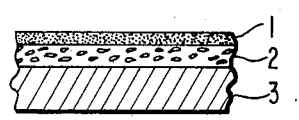
FIG. 1 is an enlarged cross-sectional view showing the construction of a multilayered magnetic recording tape.
Figure 2:
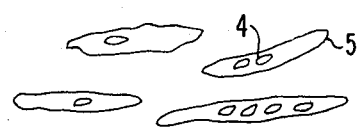
FIG. 2 is an enlarged cross-sectional view of a ferromagnetic powder.

The structure of the ferromagnetic fine particles having pores is shown in FIG. 2 in which the numeral 4 represents a pore and numeral 5 represents the ferromagnetic particles.

The preferred ferromagnetic powders used in this invention are powders of ferromagnetic iron oxides of the general formula FeO$_x$ in which $x$ is from 1.33 to 1.50, that is, maghemite ($\gamma$-Fe$_2$O$_3$, $x$ = 1.50), magnetite (Fe$_3$O$_4$, $x$ = 1.33), and Berthollide compounds thereof (FeO$_x$, 1.33 < $x$ < 1.50). The value $x$ is given by the following equation:

$$x = \frac{1}{200} \times \left\{ 2 \times \begin{pmatrix} \text{atomic percent} \\ \text{of divalent} \\ \text{iron} \end{pmatrix} + 3 \times \begin{pmatrix} \text{atomic percent} \\ \text{of trivalent} \\ \text{iron} \end{pmatrix} \right\}$$

with the atomic percent of divalent iron ranging preferably from 0 to 33.3 atomic % and with the atomic % of trivalent iron preferably ranging from 66.7 to 100%.

A divalent metal may be added to such ferromagnetic iron oxides, if desired. Examples of the divalent metal are those of Groups VI B, VII B, VIII, I B and II B of the Periodic Table, such as Cr, Mn, Co, Ni, Cu and Zn (such Periodic Table being as disclosed in *Encyclopedia Chemica,* 4, 2nd Edition, pages 618 to 619 (published by Kyoritsu Shuppan Co., Ltd., Tokyo, (1962)) and *The Merck Index,* 7th Edition, (published by Merck & Co., Inc., U.S.A. (1960))), and it is added in an amount of about 0.5 to about 20 atomic %, preferably 0.5 to 10 atomic % based on the iron metal in the iron oxide. Most preferable metal in the divalent metal described above is Co. When other metals such as Cr, Mn, Ni, Cu and Zn are added with Co metal, the amount of other metals is determined that the amount of Co metal plus other metals is within the above range.

The acicular ratio of the ferromagnetic iron oxide is most preferably about 2 : 1 to about 20 : 1, preferably more than 5 : 1, and its average length is most preferably about 0.2 to 2.0 $\mu$m.

Processes for producing these ferromagnetic iron oxides are described, for example, in Japanese Patent Publications 5009/64, 10307/64 and 39639/73. The processes described in these patents may be applied to the ferromagnetic iron oxides disclosed, for example, in Japanese Patent Publications 5515/61, 4825/62, 6538/66, 6113/67, 20381/67, 14090/69, 14934/70, 18372/70, 28466/71, 21212/72, 27719/72, 39477/72, 40758/72, 22269/73, 22270/73, 22915/73, 27200/73, 44040/73, and 15757/74, Japanese Patent Applications (OPI) 22707/72, 8496/74, 4199/74, 41299/74 (West German Patent Application (OLS) 2,221,264), 41300/74 (West German Patent Application (OLS) 2,221,218), and 69588/74 (West German Patent Application (OLS) 2,243,231), West German Patent Application (OLS) 2,022,013, and U.S. Pat. Nos. 3,075,919 and 3,389,014, etc.

Usually, the above-mentioned ferromagntic iron oxides have an APP value of about 5 to about 10. In order to reduce the APP value, it is necessary to carefully heat treat these ferromagnetic iron oxides at high temperatures. In this way, ferromagnetic iron oxides having a low APP value, i.e., having fewer pores, are obtained. This heat treatment is desirable when the ferromagnetic material is $\alpha$-Fe$_2$O$_3$ (hematite) or Fe$_3$O$_4$ (magnetite). Also, the hematite or magnetite may contain the divalent metal above described. This heat treatment is conducted in an inert gas (such as nitrogen gas or a noble gas, i.e., argon, krypton, etc.) or an oxidizing gas (such as air or oxygen gas) under the conditions of a temperature of about 700° to about 100° C; a pressure of about 1 atm., preferably 1 to 1.5 atm.; and for a time of about 0.5 to about 10 hours, preferably 1 to 6 hours; or in a reducing gas (such as hydrogen, town gas, carbon monoxide, etc.) under the conditions of a temperature of about 700° C or less, preferably 550° to 700° C; a pressure of about 1 atm., preferably 1 to 1.5 atm.; and a time of about 0.5 to about 10 hours, preferably 1 to 6 hours. The above heat treatment is preferably carefully and slowly conducted, then the hematite or magnetite is heated, dried, and annealed and then a low APP value is achieved.

These methods are disclosed in Japanese Patent Publications 26156/1963, 30037/1975 and 30038/1975. A similar method is disclosed in U.S. Pat. No. 3,652,334. The iron oxide annealed by these methods is changed to maghemite, magnetite or Berthollide iron oxide by controlling the degree of oxidation in the manner disclosed in the reference described above.

In the magnetic recording tape of this invention, the ferromagnetic iron oxide contained in the surface magnetic layer (upper layer) has an APP value of not more than 1.0, preferably not more than 0.5, most preferably nearly equal 0, and, after coating, the upper layer has a coercive force (Hc) of about 350 to about 400 Oe. Preferably, the dry thickness of the upper layer is about 2.0 to about 3.0 $\mu$m.

However, when the ferromagnetic iron oxide particles so obtained are used alone, it is difficult to produce tapes having good sensitivity and well balanced frequency characteristics.

It has been found that magnetic recording tapes having well balanced properties which can provide a high output over the entire frequency range when used with a standard bias can be obtained by providing a lower layer of magnetic iron oxide particles having a coercive force (Hc) of about 250 to about 300 Oe, a residual magnetic flux density (Br) of at least about 1,500 Gauss, preferably 1,500 to 2,500 Gauss, and a thickness of at least about 2.5 μm, preferably 3 to 10 μm. Furthermore, we have found that by using a ferromagnetic material having a low APP value and adjusting the residual magnetic flux density (Br) of the upper layer to not more than about 1,500 Gauss, preferably 1,200 to 1,500 Gauss, the SN ratio of the resulting tape is tremendously increased.

It has further been ascertained that in the present invention the difference in Hc between the upper and lower magnetic layers should be about 150 Oe at most, preferably 50 to 150 Oe, and if this parameter is observed, magnetic recording tapes having good linearity, reduced distortion, and, accordingly, very good MOL can be obtained.

We have also discovered that by using magnetic iron oxide particles having a low APP value in the upper layer, a reduction in the level of high frequency sounds can be greatly inhibited during repeated running of the magnetic tapes of this invention.

Considering most superior performance characteristics, the lower layer has a dry thickness of at least about 2.5 μm or more, preferably 3 to 10 μm and the ferromagnetic iron oxide contained in the lower layer has an APP value of about 5 to about 10, and, after coating, the lower layer has a coercive force (Hc) of about 250 to about 300 Oe.

The magnetic recording medium of this invention is produced by coating a lower magnetic layer on a nonmagnetic support, drying the coating, then coating an upper magnetic layer (surface magnetic layer) and drying the coating.

The conditions used to prepare magnetic coating compositions used in this invention are described in detail in, for example, Japanese Patent Publications 15/60, 26794/64, 186/68, 28043/72, 28045/72, 28046/72, 28048/72, 31445/72, 11162/73, 21331/73 and 33683/73, and Russian Patent Specification No. 308,033, etc. The magnetic coating compositions described in these patents consist of a ferromagnetic powder, a binder and a coating solvent as main ingredients, and may further contain optional additives such as dispersants, lubricants, abrasive agents, antistatic agents, etc.

Known thermoplastic resins, thermosetting resins or reactive resins or mixtures thereof can be used as the binder in the present invention.

The thermoplastic resins are those having a softening point of not more than about 150° C, an average molecular weight of about 10,000 to about 200,000 and a degree of polymerization of about 200 to about 2,000.

Examples of the thermoplastic resins include a vinyl chloride/vinyl acetate copolymer, a vinyl chloride/vinylidene chloride copolymer, a vinyl chloride/acrylonitrile copolymer, an acrylic ester/acrylonitrile copolymer, an acrylic ester/vinylidene chloride copolymer, an acrylic ester/styrene copolymer, a methacrylic ester/acrylonitrile copolymer, a methacrylic ester-vinylidene chloride copolymer, a methacrylic ester/styrene copolymer, a urethane elastomer, polyvinyl fluoride, a vinylidene chloride/acrylonitrile copolymer, a butadiene/acrylonitrile copolymer, polyamide resins, polyvinyl butyral, cellulose derivatives (e.g., cellulose acetate butyrate, cellulose diacetate, cellulose triacetate, cellulose propionate, and nitrocellulose, etc.), a styrene/butadiene copolymer, polyester resins, various synthetic rubber-type thermoplastic resins (e.g., polybutadiene, polychloroprene, polyisoprene, and a styrene/butadiene copolymer, etc.), and mixtures thereof.

These thermoplastic resins are exemplified, for example, in Japanese Patent Publications 6877/62, 12528/64, 19282/64, 5349/65, 20907/65, 9463/66, 14059/66, 16985/66, 6428/67, 11621/67, 4623/68, 15206/68, 2889/69, 17947/69, 18232/69, 14020/70, 14500/70, 18573/72, 22063/72, 22064/72, 22068/72, 22069/72, 22070/72 and 27886/73, and U.S. Pat. Nos. 3,144,352, 3,419,420, 3,499,789 and 3,713,887.

The thermosetting resins or reactive resins have a molecular weight of not more than about 200,000 in the form of coating solutions, and upon heating after coating and drying, their molecular weight becomes essentially infinite as a result of reactions such as condensation or addition. Of these resins, those which do not soften nor melt until they heat decompose are preferred. Specific examples are a phenol/formaldehyde novolac resin, a phenol/formaldehyde resol resin, a phenol/furfural resin, a xylene/formaldehyde resin, a urea resin, a melamine resin, a drying oil-modified alkyd resin, a cresol resin-modified alkyd resin, a maleic acid resin-modified alkyd resin, an unsaturated polyester resin, a combination of an epoxy resin and a curing agent therefor (e.g., polyamines, acid anhydrides, polyamide resins, etc.), a moisture-curable isocyanato-terminated polyester resin, a moisture-curable isocyanato-terminated polyether resin, polyisocyanate prepolymers (compounds containing at least 3 isocyanate groups per molecule obtained by reacting diisocyanates with low molecular weight triols, and trimers and tetramers of diisocyanates), a combination of a polyisocyanate prepolymer and a resin containing an active hydrogen atom (e.g., polyester-polyols, polyether-polyols, acrylic acid copolymers, maleic acid copolymers, 2-hydroxyethyl methacrylate copolymers, p-hydroxystyrene copolymers, etc.), and mixtures thereof.

These resins are exemplified, for example, in Japanese Patent Publications 8103/64, 9779/65, 7192/66, 8016/66, 14275/66, 18179/67, 12081/68, 28023/69, 14501/70, 24902/70, 13103/71, 22065/72, 22066/72, 22067/72, 22072/72, 22073/72, 28045/72, 28048/72 and 28922/72, and U.S. Pat. Nos. 3,144,353, 3,320,090, 3,437,510, 3,597,273, 3,781,210, and 3,781,211.

These binder resins can be used either alone or in combination, and various additives can be incorporated therein, if desired. The amount of the binder used is about 8 to about 400 parts by weight, preferably 10 to 200 parts by weight, most preferably 10 to 100 parts by weight, per 100 parts by weight of the ferromagnetic powder.

In addition to the binder and ferromagnetic fine powder described above, the magnetic recording layers may further comprise additives such as dispersants, lubricants, abrasives, antistatic agents, etc.

Examples of the dispersants are fatty acids containing 12 to 18 carbon atoms ($R_1COOH$ wherein $R_1$ is an alkyl or alkenyl group containing 11 to 17 carbon atoms) such as caprylic acid, capric acid, lauric acid, myristic acid, palmitic acid, stearic acid, oleic acid, elaidic acid, linoleic acid, linolenic acid or stearolic acid; metallic soaps consisting of an alkali metal (e.g., Li, Na or K) or an alkaline earth metal (e.g., Mg, Ca, or Ba) salt of the above fatty acids; fluorine-containing esters of the above fatty acids; amides of the above fatty acids; polyalkylene oxides alkyl phosphates; lecithin; and trialkyl polyolefin quaternary ammonium salts (the alkyl group containing 1 to 5 carbon atoms and the olefin being ethylene, propylene, etc.). Higher alcohols containing 12 or more carbon atoms and sulfuric acid esters can also be used. The dispersant is typically used in an amount of 0.5 to 20 parts by weight per 100 parts by weight of the binder. The dispersants are described, for example, in Japanese Patent Publications 28369/64, 17945/69, 7441/73, 15001/73, 15002/73, 16363/73, and 4121/75, and U.S. Pat. Nos. 3,387,993 and 3,470,021, etc.

Examples of the lubricants include silicone oils such as dialkyl polysiloxanes (the alkyl moiety having 1 to 5 carbon atoms), dialkoxy polysiloxanes (the alkoxy moiety containing 1 to 4 carbon atoms), monoalkyl-monoalkoxy polysiloxanes (the alkyl moiety containing 1 to 5 carbon atoms and the alkoxy moiety containing 1 to 4 carbon atoms), phenyl polysiloxane, and fluoroalkyl polysiloxanes (the alkyl moiety containing 1 to 5 carbon atoms); electrically conductive fine powders such as graphite; inorganic powders such as molybdenum disulfide or tungsten disulfide; finely powdered plastics such as polyethylene, polypropylene, an ethylene/vinyl chloride copolymer, or polytetrafluoroethylene; unsaturated aliphatic hydrocarbons (compounds having an n-olefinic double bond bonded to the terminal carbon; with about 20 carbon atoms) which are liquid at room temperature; and fatty acid esters derived from monobasic fatty acids containing 12 to 20 carbon atoms and monohydric alcohols containing 3 to 12 carbon atoms. The lubricant is typically used in an amount of 0.2 to 20 parts by weight per 100 parts by weight of the binder. Useful lubricants are described, for example, in Japanese Patent Publications 23889/68, 40461/71, 15621/72, 18482/72, 28043/72, 30207/72, 32001/72, 7442/73, 14247/74 and 5042/75, U.S. Pat. Nos. 3,470,021, 3,492,235, 3,497,411, 3,523,086, 3,625,760, 3,630,772, 3,634,253, 3,642,539 and 3,687,725, *IBM Technical Disclosure Bulletin*, Vol. 9, No. 7, page 779 (December 1966), and *ELEKTRONIK*, 1961, No. 12, page 380, etc.

Abrasives include those generally used in this art, for example, fused alumina, silicon carbide, chromium oxide, corundum, artificial corundum, diamond, artificial diamond, garnet, and emery (mainly comprising corundum and magnetite, etc.). These abrasives suitably have a Mohs' hardness of at least 5 and an average particle diameter of 0.05 to 5 $\mu$, preferably 0.1 to 2 $\mu$. The abrasive is typically used in an amount of 0.5 to 20 parts by weight per 100 parts by weight of the binder. These abrasives are described, for example, in Japanese Patent Publications 18572/72, 15003/73, 15004/73 (U.S. Pat. No. 3,617,378), 39402/74 and 9401/75, U.S. Pat. Nos. 3,007,807, 3,041,196, 3,293,066, 3,630,910, and 3,687,725, British Patent No. 1,145,349, West German Patent Applications 853,211 and 1,101,000.

Examples of the antistatic agents include electrically conductive powders such as carbon black, or carbon black graft polymers (e.g., the graft polymerization product of (1) carbon black and (2) an acrylate, a methacrylate or a copolymer of vinyl chloride, styrene and an acrylate or methacrylate); natural surface active agents such as saponin; nonionic surface active agents such as those of the alkylene oxide, glycerin, or glycidol type; cationic surface active agents such as higher alkylamines, quaternary ammonium salts, pyridine and other heterocyclic compounds phosphoniums, or sulfoniums; anionic surface active agents containing an acid group such as a carboxylic, sulfonic, phosphoric, sulfuric ester or phosphoric ester group; and amphoteric surface active agents such as amino acids, aminosulfonic acids, or sulfuric acid or phosphoric acid esters of aminoalcohol. A suitable amount of the electrically conductive powder is at least about 10% by weight, preferably 0.1 to 8% by weight, and for the surface active agent is at least about 10% by weight, preferably 0.1 to 7% by weight, each of these percentages by weight being based on the weight of the ferromagnetic powder.

Surface active agents usable as antistatic agents in this invention are partly exemplified in, for example, Japanese Patent Publications 22726/71, 24881/72, 26882/72, 15440/73 and 26761/73, U.S. Pat. Nos. 2,271,623, 2,240,472, 2,288,226, 2,676,122, 2,676,924, 2,676,975, 2,691,566, 2,727,860, 2,730,498, 2,742,379, 2,739,891, 3,068,101, 3,158,484, 3,201,253, 3,210,191, 3,294,540, 3,415,649, 3,441,413, 3,442,654, 3,475,174, and 3,545,974, West German Patent Application (OLS) 1,942,665, British Patents 1,077,317 and 1,198,450, Ryohei Oda et al., *Synthesis and Application of Surface Active Agents* (Japanese language publication, 1964, Maki Shoten, Tokyo), A. M. Schwartz and J. W. Perry, *Surface Active Agents* (Interscience Publication Incorporated, 1958), J. P. Sisley, *Encyclopedia of Surface Active Agents*, 2nd Vol. (Chemical Publishing Company, 1964), and *Manual of Surface Active Agents*, 6th impression (Japanese language publication, published Dec. 20, 1966, Sangyo Tosho K.K., Japan).

These surface active agents may be used alone or in combination. They are used primarily as antistatic agents, but sometimes serve other purposes, for example, for dispersion, improving magnetic characteristics or improving lubricity, or as coating aids.

The magnetic recording layer of this invention is produced by dissolving coating materials of the types described hereinabove in organic solvents, kneading and dispersing them to form a coating dispersion for the upper and lower layers, coating and drying the lower magnetic layer on a non-magnetic support, and then coating and drying the upper magnetic layer thereon. During the time from the coating of each of the magnetic layers to its drying, each of the layers may be subjected to an orientation of the magnetic powder, if desired. Or, after drying, each of the magnetic layers may be subjected to a surface smoothening treatment.

The material for the non-magnetic support can be selected from those conventionally known, if desired, and include, for example, polyesters such as polyethylene terephthalate or polyethylene-2,6-naphthalate, etc., polyolefins such as polypropylene, etc., cellulose derivatives such as cellulose triacetate or cellulose diacetate, etc., and other plastics such as polycarbonate, etc.

The support may be in such a form as a film, tape, or sheet, etc., and various materials can be selected depending on the desired form. In the form of a film, tape or sheet, the non-magnetic support commonly will have a thickness of about 2 to about 50 $\mu$m, preferably 3 to 25 $\mu$m. The shape of the support is determined according to the recorder used.

The support, if in the form of a film, tape, sheet or thin flexible disc, may be back-coated on the surface which is opposite to the magnetic layers in order to prevent static buildup, transfer, or flutter and wow, etc., if desired.

Useful back-coatings are described, for example, in U.S. Pat. Nos. 2,804,401, 3,293,066, 3,617,378, 3,062,676, 3,734,772, 3,476,596, 2,643,048, 2,803,556, 2,887,462, 2,923,642, 2,997,451, 3,007,892, 3,041,196, 3,115,420, 3,166,688 and 3,761,311, etc.

The magnetic fine powder, the binder, the additives such as dispersants, lubricants, abrasives, antistatic agents, etc., and the solvent are kneaded to form a magnetic coating composition.

In kneading, the magnetic powder and the other components are put into a kneader either simultaneously or successively. For example, the magnetic powder can be added to a solvent containing a binder, and kneading continued for a prescribed period of time to form a magnetic coating composition.

Various types of kneaders can be used to prepare the magnetic coating composition by kneading and dispersing, for example, a two-roll mill, a three-roll mill, a ball mill, a pebble mill, a trommel mill, a sand grinder, a Szegvari attriter, a high speed impeller disperser, a high speed stone mill, a high speed impact mill, a disper, a kneader, a high speed mixer, a homogenizer, an ultrasonic disperser, etc.

Techniques of kneading and dispersing are described in detail in T. C. Patton et al., *Paint Flow and Pigment Dispersion*, (John Wiley & Sons, 1964), and in U.S. Pat. Nos. 2,581,414 and 2,855,156.

Coating of the magnetic recording layers on the support can be effected by, for example, air doctor coating, blade coating, air knife coating, squeeze coating, dip coating, reverse roll coating, transfer roll coating, gravure coating, kiss coating, cast coating, or spray coating. Other methods are also useful. A specific descriptions of these coating techniques are given in the Japanese language publication entitled *Coating Engineering*, pages 253 – 277, published Mar. 20, 1971, Asakura Shoten, Tokyo.

The magnetic recording medium of this invention is prepared by coating and drying a magnetic layer on a non-magnetic support by any of the above coating methods, and repeating coating to form a two-layered magnetic coating. If desired, the two magnetic layers can be simultaneously coated by the simultaneous multilayer coating method described, for example, in Japanese Patent Applications (OPI) 98803/73 (West German Patent Application (OLS) 2,309,159) and 99233/73 (West German Patent Publication 2,309,158), etc.

Examples of the organic solvents that can be used for coating include ketones such as acetone, methyl ethyl ketone, methyl isobutyl ketone or cyclohexanone; alcohols such as methanol, ethanol, propanol or butanol; esters such as methyl acetate, ethyl acetate, butyl acetate, ethyl lactate, or glycol acetate monoethyl ether; glycol ethers such as ether, glycol dimethyl ether, glycol monoethyl ether, or dioxane; aromatic hydrocarbons such as benzene, toluene or xylene; and chlorinated hydrocarbon such as methylene chloride, ethylene chloride, carbon tetrachloride, chloroform, ethylene chlorohydrin, or dichlorobenzene. These solvents can be used to coat both the upper and lower layers. The solvents for the upper and lower layer may be the same or different, as desired.

The magnetic layers coated on the support in such a manner can be subjected, if desired, to an orientation treatment to orient the magnetic powders in the layers, and then the resultant magnetic layers dried. If desired, the magnetic layers can be subjected to a surface smoothing treatment, or cut to a desired shape thereby to form the magnetic recording medium of this invention, if necessary. It has been found that by surface smoothing, magnetic recording media having a smooth surface and superior abrasion resistance can be obtained.

The orienting magnetic field used for the above purpose is generally of an intensity of about 500 to about 2,000 Gauss, and can be alternating or direct current. The drying temperature for the magnetic layers is generally about 50° to about 100° C, preferably 70° to 100° C, more preferably 80° to 90° C. Typically, drying air is applied to speed drying, and the flow rate of air is 1 to 5 kl/m$^2$, preferably 2 to 3 kl/m$^2$. The drying time is usually about 30 seconds to about 10 minutes, preferably 1 to 5 minutes.

The orienting direction of the magnetic recording medium is determined according to its use. In the case of sound tapes, small video tapes, and memory tapes, it is parallel to the longitudinal direction of the tape. In the case of video tapes for broadcasting stations, the orienting direction is about 30° to about 90° inclined with respect to the longitudinal direction of the tape.

Useful methods of orienting magnetic powders are disclosed, for example, in U.S. Pat. Nos. 1,949,840, 2,796,359, 3,001,891, 3,172,776, 3,416,949, 3,473,960 and 3,681,138, and Japanese Patent Publications 3427/57, 28368/64, 23624/65, 23625/65, 13181/66, 13043/73 and 39722/73.

Moreover, as shown in West German Patent Publication 1,190,985, the orientations of the upper and lower layers may be in different directions, if desired.

The surface smoothing of the magnetic layers after drying is carried out by calendering.

Calendering is preferably carried out by a supercalendering method wherein the magnetic tape is passed between two rolls, for example, a metal roll and a cotton roll or a synthetic resin roll (for example, a nylon roll). It is preferred that the super-calendering be conducted at an inter-roll pressure of about 25 to about 250 kg/cm, a temperature of about 35° to about 150° C, and a treating speed on the order of 5 to 120 meters/min. If the temperature and pressure exceed the upper limits specified above, adverse effects result on the magnetic layers and the non-magnetic support. Furthermore, when the treating speed is less than about 5 meters/min, no effect of surface smoothing can be obtained. When it is higher than about 120 meters/min, the treating operation becomes difficult.

Useful surface-smoothing treatments are described, for example, in U.S. Pat. Nos. 2,688,567, 2,998,325 and 3,783,023, West German Patent Application (OLS) 2,405,222, and Japanese Patent Applications (OPI) 53631/74 and 10337/75.

The magnetic recording tapes of this invention have the following effects and advantages.

(i) They are usable with bias and equalization at normal, standard or low noise positions.

(ii) They have reduced distortion with little head demagnetization.

(iii) They have a high MOL (maximum output level).

(iv) They cause less head wear than $CrO_2$.

(v) They permit recording and playback of sounds over the broad range of low to high frequencies.

(vi) They permit recording and playback at high levels.

(vii) They afford good output over the entire frequency range when using standard equalization.

(viii) They do not have an increased noise level and have an increased SN ratio.

These effects and advantages are especially outstanding when the magnetic recording tapes are ¼ inch wide open reel tapes, ¼ inch wide EL cassette and 3.81 mm wide Phillips type cassette tapes.

The following Examples and Comparative Examples illustrate the invention in greater detail. It will be obvious to those skilled in the art that the components, proportions, operating sequences, etc., herein described can be changed without departing from the spirit and scope of the invention. Accordingly, the invention is not limited in any way to the following Examples. All parts in the Examples are by weight.

measured magnetic characteristics of the tapes are shown in Tables 2 and 3.

TABLE 2

| Sample No. | Ferromagnetic Powder | Average Particle Size ($\mu$m) | Acicular Ratio | APP Value | Coercive Force Hc (Oe) | Thickness of Magnetic Layer ($\mu$m) | Residual Magnetic Flux Density Br (Gauss) |
|---|---|---|---|---|---|---|---|
| 1 | $\gamma$-$Fe_2O_3$ | 0.8 | 7 : 1 | 5 | 330 | 6.0 | 1,400 |
| 2 | $CrO_2$ | 0.9–1.0 | 12 : 1 | 0.1 | 480 | 6.0 | 1,900 |
| 3 | Co (1 atomic %)-containing $\gamma$-$Fe_2O_3$ | 0.8 | 7 : 1 | 0.2 | 380 | 6.0 | 1,400 |

TABLE 3

Electromagnetic Characteristics (Cf. 1)

| Sample No. | Actuating Bias (%) | Sensitivity (dB) | Frequency Characteristics (dB) | Demagnetization (dB) | MOL (dB) | SN Ratio (dB) |
|---|---|---|---|---|---|---|
| 1 | 100 | 0 | 0 | 2.8 | 0.5 | 51.3 |
| 2 | 160 | −2.5 | 9.2 | 1.0 | 3.3 | 52.5 |
| 3 | 120 | −0.5 | 3.0 | 2.3 | 3.8 | 50.2 |

(Cf. 1) The magnetic characteristics were determined in accordance with "Method for Testing Sound Cassette Tapes" stipulated in MTS-102 of Standard Specifications by the Association of Magnetic Tape Industry, Japan.
A: The actuating bias (%) was measured at a frequency of 4,000 Hz.
B: The sensitivity (dB) was measured at a freqency of 333 Hz.
C: The frequency characteristics (dB) were measured at a frequency of 10 KHz.
D: Demagnetization refers to the reduction (dB) in output after 100 runnings as against the initial signal output at a frequency of 10 KHz and a recording wavelength of 4.75 $\mu$.
E: MOl (dB) was expressed as the output level at which the rate of distortion at 333 Hz was 5%.
F: The SN ratio (dB) refers to the output value at a 0 dB input with a 1 KHz signal as against the output after passage through an auditory sense correcting circuit for bias noises.

COMPARATIVE EXAMPLE 1

Preparation of a magnetic recording medium with a single magnetic layer:

| | |
|---|---|
| Ferromagnetic fine powder (see Table 2) | 100 parts |
| Vinylidene chloride resin (vinyl chloride/vinylidene chloride copolymer; 87 : 13 mol %, respectively; degree of polymerization 400) | 20 parts |
| Ethyl acrylate/acrylonitrile copolymer (copolymerization ratio: about 6 : 4 molar ratio; a viscosity of about 1,500 to about 2,500 centipose at 30° C, (40% by weight ethyl acetate solution) ) | 15 parts |
| Dibutyl phthalate | 2 parts |
| Lecithin | 1.5 parts |
| Carbon black (average particle size: 40 $\mu$m) | 0.5 part |
| Butyl acetate | 250 parts |

The above ingredients were mixed and dispersed thoroughly to form a magnetic coating composition. The composition was coated on a 12 $\mu$m thick polyethylene terephthalate support to a dry thickness of 6 $\mu$m, oriented using a DC magnetic field of 2,000 Gauss, dried (at 100° C, with air blown thereon at a rate of 3 kl/m² for 5 minutes) and subjected to super-calendering at 200 kg/cm using a chromium electroplated iron roll and a nylon roll at 90° C at a passage rate of 50 meters/min. The tape obtained was cut to a width of 3.81 mm, and mounted in a Phillips type tape cassette. The characteristics of the ferromagnetic powders used, and the

EXAMPLE 1

EXAMPLE 1

| | |
|---|---|
| Ferromagnetic fine powder (see Table 4) | 100 parts |
| Vinylidene chloride resin (vinyl chloride/vinylidene chloride copolymer; 87 : 13 mol%, respectively; degree of polymerization 400) | 20 parts |
| Polyester-polyurethane (molecular weight about 30,000; reaction product betwen a polyester derived from adipic acid, diethylene glycol and butanediol and a diphenylmethane diisocyanate) | 10 parts |
| Triisocyanate compound (a 75% by weight ethyl acetate solution of a reaction product between 3 mols of toluene diisocyanate and 1 mol of trimethylol propane; available under the trademark Desmodur L-75, a product of Bayer AG) | 5 parts |
| Dibutyl phthalate | 2 parts |
| Lecithin | 2 parts |
| Butyl acetate | 250 parts |

The above ingredients were thoroughly mixed and dispersed to form a magnetic coating composition for the lower layer which was coated on a 12 $\mu$m thick polyethylene terephthalate support, and dried to a dry thickness in Table 4.

| | |
|---|---|
| Ferromagnetic fine powder (see Table 4) | 100 parts |
| Vinylidene chloride resin (87 mol% of vinyl chloride and 13 mol% of vinylidene chloride; degree of Polymerization 400) | 20 parts |
| Ethyl acrylate/acrylonitrile copolymer (copolymerization ratio: about 6 : 4 molar ratio; a viscosity of about 1,500 to about 2,500 centipoise at 30° C, (40% by weight ethyl acetate solution) ) | 15 parts |
| Dibutyl phthalate | 2 parts |

-continued

| | |
|---|---|
| Lecithin | 1.5 parts |
| Carbon black (average particle size 40 μm) | 0.5 part |
| Butyl acetate | 250 parts |

The above ingredients were thoroughly mixed and dispersed to form a magnetic coating composition for the upper layer which was coated on the lower magnetic layer, oriented using a DC magnetic field of 2,000 Gauss and dried (at 100° C, while blowing air at a rate of 2.5 kl/m² for 3 minutes) to a dry thickness in Table 4. The resulting magnetic coating was subjected to a super-calendering at 150 kg/cm using a chromium electroplated iron roll and a nylon roll at 85° C at a passage rate of 50 meter/min, cut to a width of about 3.81 mm, and mounted in a Phillips type tape cassette. The characteristics of the ferromagnetic powders used and the magnetic characteristics of the tapes are shown in Tables 4 and 5, respectively.

TABLE 4

| Sample No. | Ferromagnetic Powder | Average Particle Length (μm) | Acicular Ratio | APP Value | Coercive Force Hc (Oe) | Thickness of Magnetic Layers (μm) | Residual Magnetic Flux Density Br (Gauss) |
|---|---|---|---|---|---|---|---|
| 4 | U γ-Fe₂O₀ | 0.5 | 8 : 1 | 0.8 | 380 | 2.5 | 1,400 |
|   | L γ-Fe₂O₃ | 0.8 | 7 : 1 | 8 | 280 | 3.5 | 1,800 |
| 5 | U Co (1.5 atomic %)-containing γ-Fe₂O₃ | 0.4 | 8 : 1 | 0.3 | 400 | 2.0 | 1,300 |
|   | L γ-Fe₂O₃ | 0.8 | 7 : 1 | 8 | 270 | 4.0 | 1,800 |
| 6 | U γ-Fe₂O₃ | 0.4 | 8 : 1 | 0.5 | 350 | 3.0 | 1,500 |
|   | L γ-Fe₂O₃ | 0.8 | 7 : 1 | 8 | 300 | 3.5 | 1,700 |
| 7 | U γ-Fe₂O₃ | 0.5 | 8 : 1 | 0.3 | 400 | 2.0 | 1,300 |
|   | L γ-Fe₂O₃ | 0.8 | 7 : 1 | 8 | 250 | 4.0 | 1,800 |
| 8 | U γ-Fe₂O₃ | 0.5 | 8 : 1 | 0.8 | 360 | 2.0 | 1,400 |
|   | L γ-Fe₂O₃ | 0.8 | 7 : 1 | 8 | 300 | 4.0 | 1,800 |

U Upper layer
L Lower layer

TABLE 5

| | Electromagnetic Characteristics* | | | | | |
|---|---|---|---|---|---|---|
| Sample No. | Actuating Bias (%) | Sensitivity (dB) | Frequency Characteristics (dB) | Demagnetization (dB) | MOL (dB) | SN Ratio (dB) |
| 4 | 105 | 4.0 | 2.0 | −0.6 | 6.5 | 54.0 |
| 5 | 106 | 3.5 | 2.5 | −0.3 | 5.9 | 54.1 |
| 6 | 100 | 4.2 | 1.5 | −0.3 | 6.3 | 53.9 |
| 7 | 102 | 3.5 | 2.3 | −0.6 | 5.7 | 53.0 |
| 8 | 102 | 4.2 | 1.8 | −0.7 | 6.2 | 53.5 |

*All determined as in Comparative Example 1; hereafter the same.

EXAMPLE 2

Magnetic tapes were prepared using magnetic coating solutions having the same compositions as Sample 4 in Example 1. The dry thicknesses of the upper and lower layers (a total of 6 μm), and the ferromagnetic powders used are shown in Table 6, and the electromagnetic characteristics of the magnetic tapes obtained are shown in Table 7.

TABLE 6

| Sample No. | Ferromagnetic Powder | Average Particle Length (μm) | Acicular Ratio | APP Value | Coercive Force Hc (Oe) | Thickness of Magnetic Layers (μm) | Residual Magnetic Flux Density Br (Gauss) |
|---|---|---|---|---|---|---|---|
| 9 | U γ-Fe₂O₃ | 0.4 | 8 : 1 | 0.5 | 380 | 1.5 | 1,400 |
|   | L γ-Fe₂O₃ | 0.8 | 7 : 1 | 8 | 280 | 4.5 | 1,800 |
| 10 | U γ-Fe₂O₃ | 0.4 | 8 : 1 | 0.5 | 380 | 2.0 | 1,400 |
|   | L γ-Fe₂O₃ | 0.8 | 7 : 1 | 8 | 280 | 4.0 | 1,800 |
| 4 | U γ-Fe₂O₃ | 0.4 | 8 : 1 | 0.5 | 380 | 2.5 | 1,400 |
|   | L γ-Fe₂O₃ | 0.8 | 7 : 1 | 8 | 280 | 3.5 | 1,800 |
| 11 | U γ-Fe₂O₃ | 0.4 | 8 : 1 | 0.5 | 380 | 3.0 | 1,400 |
|   | L γ-Fe₂O₃ | 0.8 | 7 : 1 | 8 | 280 | 3.0 | 1,800 |
| 12 | U γ-Fe₂O₃ | 0.4 | 8 : 1 | 0.5 | 380 | 3.5 | 1,400 |
|   | L γ-Fe₂O₃ | 0.8 | 7 : 1 | 8 | 280 | 2.5 | 1,800 |

TABLE 7

| Sample No. | Actuating Bias (%) | Electromagnetic Characteristics ||||| 
| | | Sensitivity (dB) | Frequency Characteristics (dB) | Degmagnetization (dB) | MOL (dB) | SN Ratio (dB) |
| --- | --- | --- | --- | --- | --- | --- |
| 9  | 99  | 4.5 | 1.0 | −0.4 | 6.3 | 53.4 |
| 10 | 101 | 4.2 | 1.7 | −0.9 | 6.4 | 53.7 |
| 4  | 105 | 4.0 | 2.0 | −0.6 | 6.5 | 54.0 |
| 11 | 109 | 3.5 | 2.1 | −0.5 | 6.0 | 53.5 |
| 12 | 115 | 2.6 | 2.1 | −0.2 | 5.0 | 52.5 |

The above results demonstrate that by using ferromagnetic iron oxide having a small APP value in the upper layer of a magnetic recording medium having two magnetic layers formed on a support, the demagnetization of the magnetic recording medium is reduced. Furthermore, it is seen that when the Hc, Br and thickness of each of the upper and lower layers of the magnetic coating are limited within the ranges earlier specified the recording medium has a suitable frequency characteristic value ranging from +1.5 to +2.5 dB, and a sensitivity of at least +3.5 dB. These characteristics mean that the magnetic recording medium obtained permits good output over the entire frequency range. Furthermore, as a result of limiting the Hc and thickness within the earlier specified ranges (the difference in Hc between the upper and lower layers being 150 Oe at most), the resulting magnetic recording medium has very good linearity and reduced distortion, and, therefore, superior MOL. In addition, by limiting the Br of the upper magnetic layer to not more than about 1,500 Gauss, the SN ratio of the magnetic recording medium increases tremendously, although this also has to do with the APP value.

Figure 3:
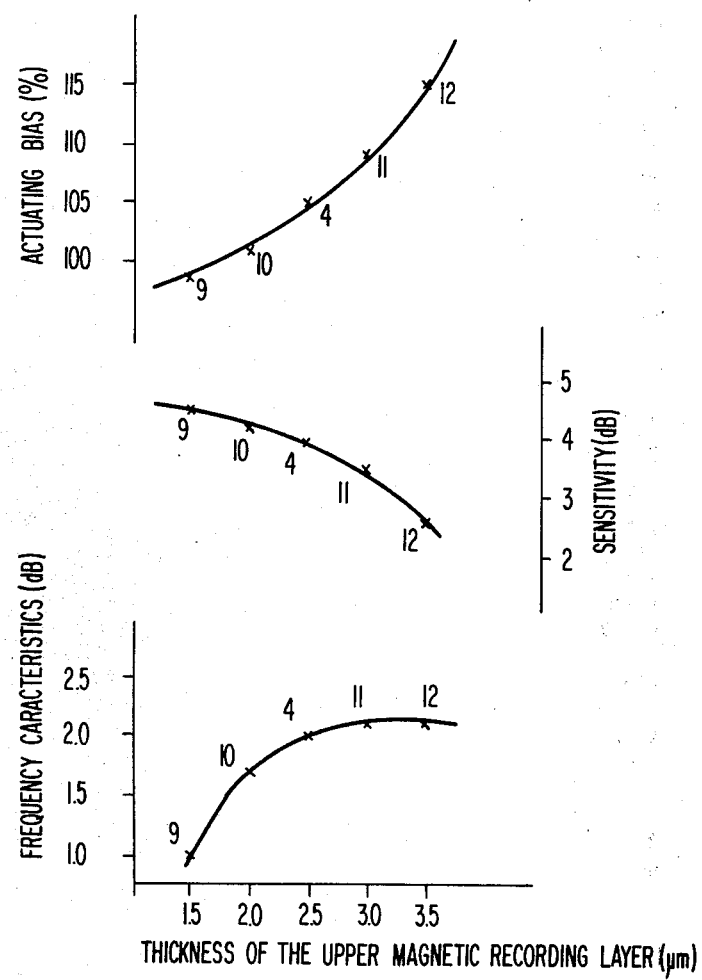
FIG. 3 is a graphic representation showing the relationship of the thickness of the upper layer in the magnetic recording tape obtained in Example 2 to its bias, sensitivity and frequency characteristics.

These values were obtained with 100% bias. FIG. 3 of the accompanying drawings shows the actuating biases, sensitivities and frequency characteristics of Samples 4, 9, 10, 11 and 12. In Sample 12, the actuating bias was 115%, and it was found undesirable for use with 100% bias. In Sample No. 9, the frequency characteristics were low, and no better than the characteristics of Samples 4, 10 and 11. Accordingly, in the present invention, the most preferred thickness of the magnetic layer is 2.0 to 3.0 μ.

Advantages obtained by the present invention include:

(1) Head demagnetization is reduced.

(2) The actuating bias is nearly 100%, and the magnetic recording tape of the invention can be used with standard bias.

(3) The frequency characteristics of the magnetic recording tape of this invention are well balanced, and, with standard equalization, the output is good over the entire frequency range.

(4) Distortion is reduced, and MOL becomes very good.

(5) Noise level does not increase, and, consequently, the SN ratio increases strikingly.

The magnetic recording tapes of this invention have universal applicability to tape recorders and tape decks now in ordinary use, and are easy to handle. It has been confirmed that they have the best characteristics of those available at the present time.

While the invention has been described in detail and with reference to specific embodiments thereof, it will be apparent to one skilled in the art that various changes and modifications can be made therein without departing from the spirit and scope thereof.

What is claimed is:

1. A magnetic recording tape comprising a non-magnetic support having thereon a two-layered magnetic coating composed of a ferromagnetic powder and a binder formed on one surface of said support, wherein the lower magnetic layer has a coercive force of about 250 to about 300 Oe, a residual magnetic flux density of at least about 1,500 Gauss and a dry thickness of at least about 2.5 μm, and the upper magnetic layer has a coercive force of about 350 to about 400 Oe, a residual magnetic flux density of not more than about 1,500 Gauss and a dry thickness of about 2.0 to 3.0 μm, the ferromagnetic powder contained in the upper magnetic layer having an APP value of not more than about 1.0 and wherein the ferromagnetic powder is a powder of a ferromagnetic iron oxide of the formula $FeO_x$ wherein $x$ is from 1.33 to 1.50.

2. The magnetic recording tape of claim 1, wherein said ferromagnetic iron oxide is maghemite, $x$ being equal to 1.50.

3. The magnetic recording tape of claim 1, wherein the ferromagnetic powder in the upper magnetic layer has an APP vaue of not more than 0.5.

4. The magnetic recording tape of claim 1, wherein the dry thickness of the lower layer is about 3 to 10 μm.

5. The magnetic recording tape of claim 1, wherein the ferromagnetic powder in the lower magnetic layer has a APP value of about 5 to about 10.

6. The magnetic recording tape of claim 1, wherein the coercive force of the upper magnetic layer is not more than about 150 Oe higher than the coercive force of the lower magnetic layer.

7. The magnetic recording tape of claim 1, wherein said ferromagnetic iron oxide contains about 0.5 to about 20 atomic %, based on the iron in the ferromagnetic iron oxide, of a divalent metal added thereto.

8. The magnetic recording tape of claim 7, wherein said divalent metal is selected from the group consisting of Cr, Mn, Co, Ni, Cu and Zn.

9. The magnetic recording tape of claim 1, wherein the ferromagnetic iron oxide having an APP value not more than about 1.0 in the upper magnetic layer is prepared by heat treating a ferromagnetic powder having an APP value of 5 to 10 in an inert gas or an oxidizing gas at a temperature of about 700° to about 100° C, a pressure of about 1 atm. for about 0.5 to about 10 hours; or by heat treating a ferromagnetic powder having an APP value of 5 to 10 in a reducing gas at a temperature of about 700° C or less, a pressure of about 1 atm. and for about 0.5 to about 10 hours.

10. The magnetic recording tape of claim 9, wherein said pressure is from 1 to 1.5 atm.

11. The magnetic recording tape of claim 9, wherein said heat treating is for 1 to 6 hours.

12. The magnetic recording tape of claim 9, wherein said heat treating in the reducing gas is at 550° to 700° C.

13. The magnetic recording tape of claim 9, wherein said inert gas is nitrogen, argon or krypton.

14. The magnetic recording tape of claim 9, wherein said oxidizing gas is air or oxygen.

15. The magnetic recording tape of claim 9, wherein said reducing gas is hydrogen or carbon monoxide.

* * * * *